US011232095B2

United States Patent
Pantela et al.

(10) Patent No.: US 11,232,095 B2
(45) Date of Patent: Jan. 25, 2022

(54) COMPOSITE METADATA OBJECTS FOR DATABASE SYSTEMS

(71) Applicant: ENTIT SOFTWARE LLC, Sanford, NC (US)

(72) Inventors: Styliani Pantela, Cambridge, MA (US); Niccolo Meneghetti, Cambridge, MA (US); Benjamin M. Vandiver, Cambridge, MA (US); Jaimin Mukesh Dave, Cambridge, MA (US)

(73) Assignee: Micro Focus LLC, Santa Clara, CA (US)

( * ) Notice: Subject to any disclaimer, the term of this patent is extended or adjusted under 35 U.S.C. 154(b) by 509 days.

(21) Appl. No.: 16/151,851

(22) Filed: Oct. 4, 2018

(65) Prior Publication Data

US 2020/0110822 A1    Apr. 9, 2020

(51) Int. Cl.
*G06F 16/23* (2019.01)
*G06F 16/16* (2019.01)
*G06F 16/22* (2019.01)

(52) U.S. Cl.
CPC ........ *G06F 16/2379* (2019.01); *G06F 16/162* (2019.01); *G06F 16/2282* (2019.01)

(58) Field of Classification Search
CPC . G06F 16/2379; G06F 16/162; G06F 16/2282
USPC .................................. 707/703, 790
See application file for complete search history.

(56) References Cited

U.S. PATENT DOCUMENTS

| | | | |
|---|---|---|---|
| 8,583,692 B2 | 11/2013 | Ganesh et al. | |
| 2007/0203925 A1* | 8/2007 | Sandler | G06F 16/2264 |
| 2012/0221528 A1* | 8/2012 | Renkes | G06F 16/00 707/674 |
| 2014/0007056 A1* | 1/2014 | Leizerovich | G06F 16/2458 717/124 |
| 2015/0370917 A1* | 12/2015 | Vandiver | G06F 16/86 707/756 |
| 2017/0139995 A1* | 5/2017 | Mielenhausen | G06F 16/22 |
| 2018/0150362 A1 | 5/2018 | Lee et al. | |
| 2018/0150499 A1* | 5/2018 | Lee | G06F 11/2048 |
| 2019/0147078 A1* | 5/2019 | Dageville | G06F 16/2358 707/695 |

FOREIGN PATENT DOCUMENTS

WO   WO-2017062288   4/2017

OTHER PUBLICATIONS

Liu, Ziyan; Efficien and Scalable Data Evolution with Column Oriented Databases; EDBT 2011; Uppsala, Sweden; Mar. 22-24, 2011; pp. 105-116.

(Continued)

*Primary Examiner* — Michael Pham

(57) ABSTRACT

A technique includes storing, by a computer, a composite metadata object in a catalog. The composite metadata object represents information about a plurality of database objects of a table structure; the table structure includes a plurality of rows and a plurality of columns; the plurality of database objects is associated with a subset of rows of the plurality of rows; and the plurality of database objects is associated with a plurality of files corresponding to the columns. The technique includes processing, by the computer, a database transaction based on the based on composite metadata object.

20 Claims, 7 Drawing Sheets

(56) References Cited

OTHER PUBLICATIONS

Oracle; "Entity Relationship Mapping"; Oracle9iAS Containers forJ2EE Enterprise JavaBeans Developer's Guide, Relesse 2 (9.0.3) Part No. A97677-01; https://docs.oracle.com/cd/B10002_01/generic.903/a97677/ormap.htm: Copyright 2002; downloaded Aug. 29, 2018; 22 pages.

Oracle; "Database In-Memory Guide"; https://docs.oracle.com/en/database/oracle/oracle-database/12.2/inmem/in-memory-column-store-architecture.html#GUID-EEA265EE-8FBA-44 . . . :copyright 2016, 2018; downloaded Aug. 29, 2018; 21 pages.

\* cited by examiner

COMPOSITE METADATA OBJECTS FOR DATABASE SYSTEMS

BACKGROUND

A database system allows large volumes of data to be stored, managed and analyzed. Data records for a relational database system may be associated with tables. A table may include one or more rows, where each row may contain a set of related data (e.g., data related to a single entity). The data for the row may be arranged in a series of fields, or columns, where each column includes a particular type of data (e.g., type of characteristic of an entity). Processing nodes of the database system may process requests for transactions, such as queries, operations to add tables, operations to add or drop columns to/from tables, and so forth. The requested operations may be expressed in a specified format (a Structured Query Language (SQL) format, for example).

DETAILED DESCRIPTION

Figure 1:
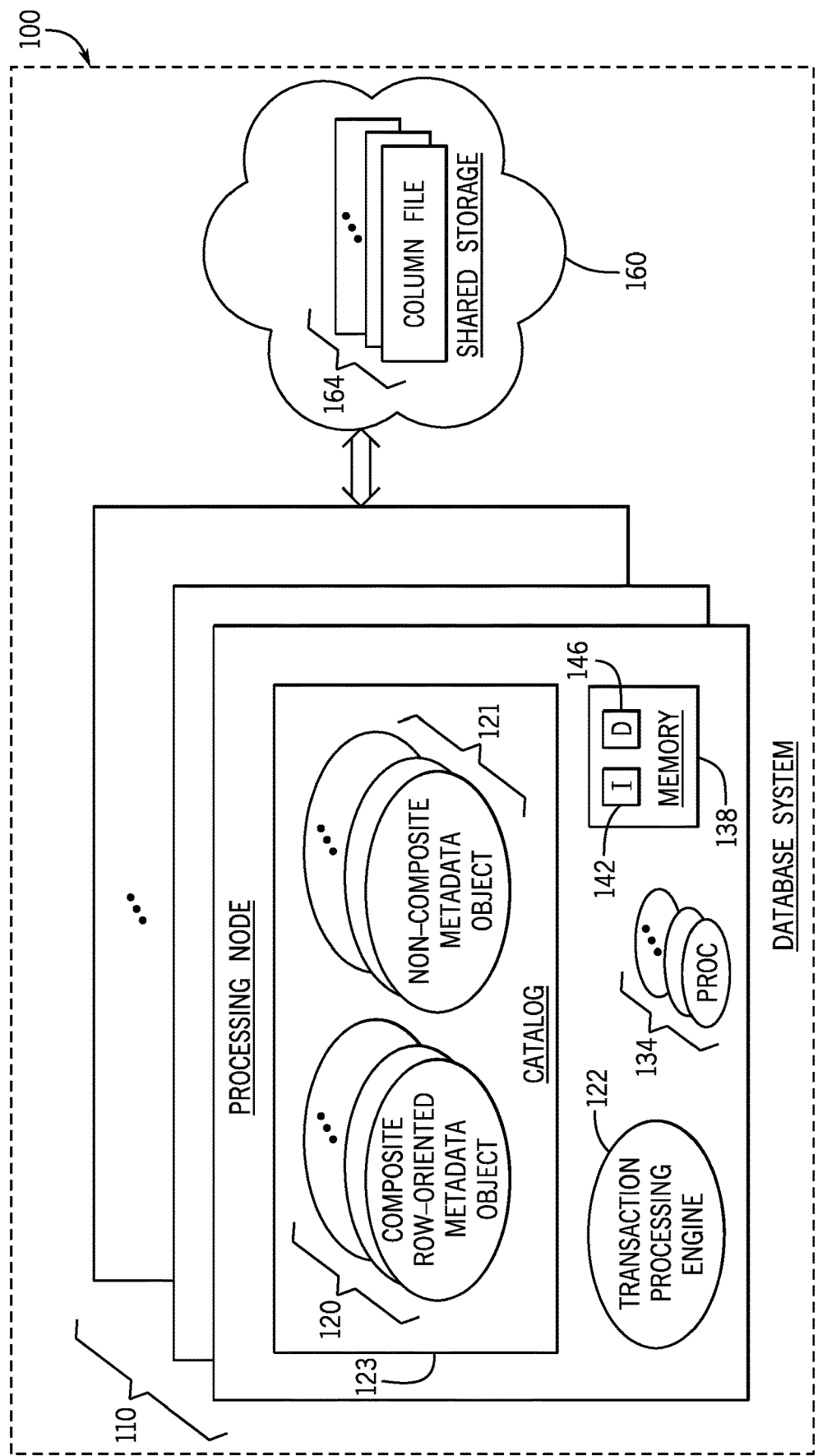
FIG. 1 is a schematic diagram of a database system according to an example implementation.

A database system may include one or multiple processing nodes that process database transactions (transactions associated with database queries, transactions associated with data load operations, and so forth) for purposes of accessing, analyzing, loading and generally managing data that is stored in a database store. In this context, a "processing node" refers to a physical machine, such as a physical machine that contains one or multiple hardware processors (central processing units (CPUs), CPU cores, and so forth). As examples, the processing node may be a personal computer, a workstation, a server, a rack-mounted computer, a special purpose computer, and so forth. A "transaction" refers to one or multiple operations, which are executed as a unit of work by the processing node.

In accordance with example implementations, the database system may store data representing various dataset structures, such as tables and table projections. In this context, a "table" refers to a particular dataset structure in which data values are arranged in rows and columns; and a given database table may have one or multiple projections.

In general, a projection is a column-oriented view of a table and has a table structure. In this manner, a projection is a view containing one or multiple selected columns of a table. For example, a table may have columns A, B, C and D. A first projection for the table may be a projection that includes columns A and D; another projection may contain columns A and B; another projection may include columns A, B and D; and so forth. Read-intensive workloads may benefit from accessing table projections. For example, a given query may target a particular subset of table columns (i.e., target a projection of the table), thereby allowing a processing node to read the data for a selected subset of columns to process the query, as opposed to, for example, reading the data for entire rows of the table.

The data for the tables and projections may be stored in files also referred to as a "column file" herein. In particular, in accordance with some implementations, the database system may store the data for a given column in a corresponding column file. In addition to storing the data for the column, the column file may also store statistical metadata (metadata representing a row count, for example) for the column data. Moreover, a given column file may be created for each column of a projection. Accordingly, a particular column for a given table may have one or multiple column files, where each column file corresponds to a column for a particular projection of the table. In accordance with example implementations, when a data load transaction is processed, which results in the loading of data for a given column of a table, a set of one or multiple column files are created (one for each projection) to reflect the new data for the column.

The database system may maintain metadata for its dataset structures. In general, a metadata object describes and gives information about objects (herein also referred to as "database objects") of the database system. In general, a "database object" refers to a dataset structure, such as tables, projections and column chunks (columnar divisions of a projection, as further described herein).

In general, the metadata objects may be stored in catalogs of the database system. Each processing node may, for example, maintain a local catalog, which represents the states of database objects stored in local storage of the processing node; and the processing may also use and maintain a global catalog, which represents the states of database objects, as committed to a globally shared storage.

Changes to the data to a given table (such as changes due to the processing of a data description language (DDL) transaction, such as a transaction to add or drop a column, results in corresponding changes to the affected metadata object(s) and may result in the creation and/or deletion of column files. For example, if metadata representing columns of a database table are stored in corresponding column metadata objects, then, in response to a column being added to a database column, a processing node may synchronously commit two sets of changes together: commit changes to the metadata to reflect the addition of the column; and commit changes to the database storage by creating corresponding column file(s) for the newly-added column.

In accordance with example implementations, the database system may reference column chunks of a given projection as corresponding database objects. More specifically, each column of a projection may be divided horizontally into a collection of column chunks, and the columns belonging to the same projection may share the same chunk boundaries. A "storage container" refers to a collection of aligned column chunks that cover all of the columns in a given projection, with one column chunk being associated with each column. In this manner, each storage container is associated with all of the columns of the projection and a subset of one or multiple rows of the projection. In this context, "a subset" of rows of a projection refers to a fewer number of rows than all of the rows of the projection.

One way to store metadata for database objects is to store one metadata object per database object in a catalog. For example, the smallest database object may be a column chunk, and each column chunk may have a corresponding metadata object, which stores metadata that describes and provides information about the column chunk. With this approach, the memberships of the metadata objects to corresponding storage containers may be expressed through an indexed dependency graph, and the memberships of the column chunks to their parent column, projection and table may be also expressed through indexed dependency graphs.

The one-to-one correspondence between the metadata objects and their database objects may result in a significant amount of redundant metadata information. For example, a metadata object that corresponds to a column chunk may have information describing the corresponding column, projection and container (i.e., row group) for the column chunk; and column chunks of the same container may contain similar information, as the columns are part of the same projection and container. Accordingly, there may be a significant amount of redundant information per metadata object. Moreover, the indexing of the dependencies, in view of the redundancies, may also result in a significant amount of data.

In accordance with example implementations that are described herein, metadata for database objects is organized such that there is a one-to-many mapping between a given metadata object and multiple database objects. In this way, the metadata objects are composite objects (i.e., one composite metadata objects maps to many database objects), with each metadata object representing information about a collection of member database objects.

More specifically, in accordance with some implementations, a composite metadata object may represent information about strongly interrelated database objects. For example, in accordance with example implementations, a composite metadata object may represent information about the column chunks of a particular storage container of a particular table projection. For this example, the column chunks that are contained in the storage container (i.e., the "collection") are the member database objects that are represented by the composite metadata object, and accordingly, the composite metadata objects describe and provide information about these column chunks. By organizing and using the metadata in this manner, the size of the metadata for the database objects may be significantly reduced due to redundant information and indexing-related information are correspondingly reduced as compared to a one-to-one metadata object-to-database object mapping scheme.

The composite metadata object may describe and provide information about a collection of interrelated database objects other than column chunks, in accordance with further implementations.

Due to the one-to-many metadata object to data object mapping, the processing node may advantageously change the composition of the metadata objects dynamically in a manner that decouples the process of changing of the metadata from the process that adds/deletes the corresponding column file(s). For example, the processing node may modify, or alter, a composite metadata object to represent that a member data object has been "dropped," or removed, without this metadata change being synchronized to the corresponding change in the database storage to delete the data for the dropped object.

As a more specific example, a composite metadata object may represent information about member column chunks that are contained in a particular container. A processing node may process a Data Definition Language (DDL) statement, such as a Drop Column transaction statement or an Add Column transaction statement, which results in a change in the structure of the container (i.e., results in a column chunk being added to or removed from the container). As a result of this processing, the processing node may first change the composite metadata objects that are affected by the dropped or added column; and thereafter, at a later time, the processing node may add or delete column files to effect this change in database storage.

More specifically, as an example, the processing node may process an Add Column transaction to add a column to a table. Accordingly, processing this transaction may affect multiple composite metadata objects that represent information about containers that will now (due to the added column) contain column chunks that correspond to the added column. For one of these composite metadata objects that correspond to the newly added column, the processing node may alter, or modify, the composite metadata objects to add information for the newly-added column (i.e., add information about the new column chunks), without synchronizing changes to a corresponding database storage change (e.g., without immediately creating a column file for the newly-added column). Continuing the example, the processing node may commit changes to the composite metadata objects so that the composite metadata objects represent that the newly-added column contains default values (null values, for example), all without committing changes to the database storage. Instead of concurrently committing the changes to the database storage, the processing node may asynchronously (with respect to the committing of the changes to the composite metadata objects) commit the changes to database storage by waiting to create a new column file until data for the new column is loaded (adding the column files) in response to a load data transaction that loads data for the new column, for example.

As another example, the processing node may process a Drop Column transaction to remove a particular column by first modifying the affected composite metadata objects to remove information about the removed column from objects; and the processing node may refrain from synchronously committing the changes to database storage (by deleting the corresponding column files, for example). Instead of synchronously committing the changes to database to delete the affect column file(s), the processing node may leave the deletion of the column files to a garbage collection process.

The use of the composite metadata objects therefore allows the use of a "lazy" approach to committing changes to database storage.

As a more specific example, FIG. 1 depicts a distributed relational database system 100 in accordance with some implementations. Depending on the particular implementation, the database system 100 may be a public cloud-based system, a private cloud-based system, a hybrid-based system (i.e., a system that has public and private cloud components), a private system disposed on site, a private system geographically distributed over multiple locations, and so forth.

The database system 100 includes one or multiple processing nodes 110; and each processing node 110 may include one or multiple personal computers, work stations, servers, rack-mounted computers, special purpose computers, and so forth. Depending on the particular implementation, the processing nodes 110 may be located at the same geographical location or may be located at multiple geographical locations. Moreover, in accordance with example implementations, multiple processing nodes 110 may be rack-mounted computers, such that sets of the processing nodes 110 may be installed in the same rack.

In accordance with example implementations, the processing nodes 110 may be coupled to a shared storage 160 of the database system 100 through network fabric (not shown in FIG. 1). In general, the network fabric may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The storage 160 is a "shared storage," in that the storage 160 may be shared, or accessed, by multiple processing nodes 110. In accordance with example implementations, the shared storage 160 stores column files 164. In accordance with some implementations, a given column file 164 corresponds to a particular column and a particular projection for a particular table. Therefore, for example, if a particular database table has two projections involving the same column, this column has two corresponding column files; and in general, each time that data is loaded for a particular column, one or multiple column files 164 are created and correspondingly stored in the storage 160, depending on the number of projections that contains the column. Correspondingly, if a particular column is dropped, or removed, from a table, then one or multiple column files 164 are deleted, depending on the number of projections associated with the removed column. In accordance with example implementations, the removal or deletion of a file refers to the deallocation of storage space occupied by the file. The actual data for the file may or may not be erased but rather, the storage space is made available for other storage, such as the storage of another file, for example.

In accordance with example implementations, database objects, such as tables, projections, columns, and so forth, may be associated with particular non-composite metadata objects 121. In this context, a "non-composite" metadata object refers to metadata that has a one-to-one correspondence with the database object. As examples, the non-composite metadata objects 121 may be metadata objects corresponding to tables, projections and columns of various tables represented by the column files 164.

In accordance with example implementations, the database system 100 may include composite row-oriented metadata objects 120 (herein also referred to as "composite metadata objects 120"), which have a one-to-many correspondence with the database objects. As an example, the database object may be a container of column chunks of a table projection; and the database system may store a corresponding composite metadata object 120 that represents information about the container, such as the schema (the organizational structure) of the associated table, the name of the associated table, the version of the associated table, information about the number of column chunks in the container, and so forth. In accordance with example implementations, the metadata may be "global metadata," which refers to metadata that is associated with objects that have been published, or committed, to the shared storage or "local metadata," which is associated with objects that are local for a given processing node and have not been published, or committed, to the shared storage 160.

The metadata objects 120 and 121 may be stored in one or multiple catalogs, such as a catalog 123 that is illustrated in FIG. 1. The catalog 123 may be a global catalog or a local catalog. A "global catalog" contains the global metadata for the objects that have been committed to storage, and in accordance with example implementations, each processing node 110 contains a copy of the global catalog, called a "local catalog." The local catalog may contain committed objects and may be associated with files published on shared storage. The global catalog may or may not contain uncommitted objects, depending on the particular implementation.

As a more specific example, in accordance with some implementations, for a given storage container, the composite metadata object 120 may provide the following information, which is shared in common among the column chunks: a row count (i.e., the row(s) identifier(s) associated with the column chunk), a projection identification (ID), a version number, and so forth. The composite metadata object 120 may also provide information that is unique to each column chunk in the container: a null value count, a minimum value, a maximum value, a size, a compression type, and so forth.

The shared storage 160 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the shared storage 160 may be located at the same geographical location or may be located at multiple geographical locations.

The database system 100 may have one of many different types of storage, depending on the application which the database system 100 serves. For example, a business enterprise may have a database system that is deployed on-site and has direct attached storage. The direct attached storage allows the database system to have a relatively high input/output (I/O) bandwidth and correspondingly be capable of processing queries in an efficient manner. As another option, the database system 100 may be cloud-based, which is a distributed system that allows the number of active nodes to be scaled based on user load.

Regardless of its particular form, the shared storage 160 stores column files 164 for database objects of the database system 100 (i.e., the data for the committed, or published, objects). As noted herein, the shared storage 160 may be shared in the sense that the shared storage 160 may be commonly accessible by multiple and different processing nodes 110 of the database system 100.

In accordance with example implementations that are described herein, the processing node 110 includes a transaction processing engine 122, which is constructed to structure the metadata as described herein (i.e., store the metadata in the form of the composite 120 and non-composite 121 metadata objects); access the metadata; modify, or alter, the metadata as described herein; create column files 164; delete column files 164; process database transactions and so forth.

In accordance with example implementations, the processing node 110 may include one or multiple physical hardware processors 134, such as one or multiple central processing units (CPUs), one or multiple CPU cores, and so forth. Moreover, the processing node 110 may include a local memory 138. In general, the local memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (data representing metadata associated with the metadata objects 120 and 121, writesets representing the results of uncommitted changes to database objects, and so forth). The memory 138 may store machine executable instructions 142 that, when executed by one or multiple processors 134, cause the processor(s) 134 to form one or multiple components of the processing node 110, such as, for example, the transaction processing engine 122. In accordance with example implementations, the memory 138 may store machine executable instructions 142 that, when executed by the processor(s) 134, cause the processor(s) 134 to create, maintain and use composite metadata objects, as described herein.

Figure 2:
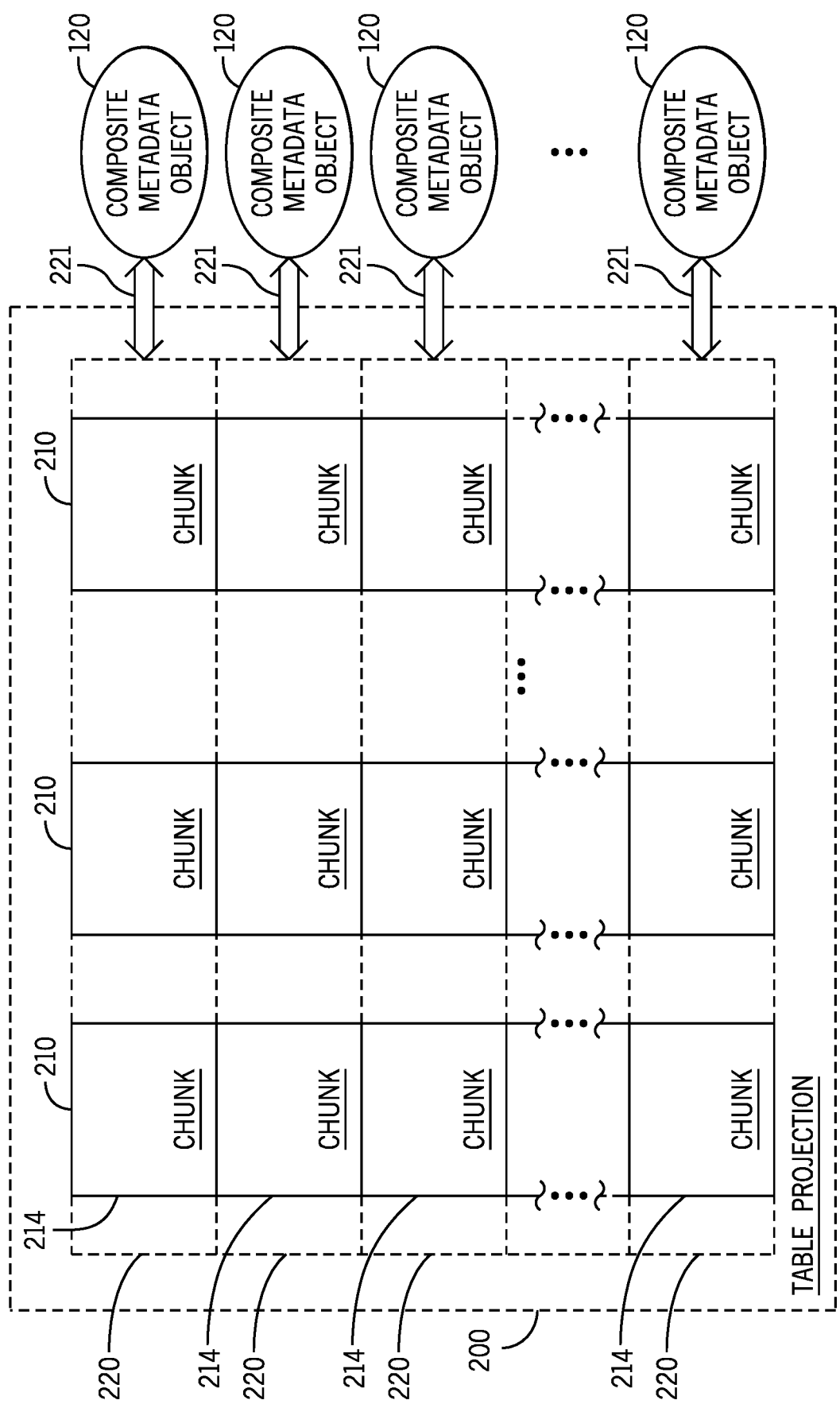
FIG. 2 is an illustration of relationships among containers, columns, rows and composite metadata objects of a table projection according to an example implementation.

FIG. 2 is an illustration of the relationship between composite metadata objects 120, column chunks 214 and containers 220 for an example table projection 200, in accordance with example implementations. As depicted in FIG. 2, the table projection 200 is associated with multiple columns 210 of a particular database table. Moreover, the column 210 may be horizontally partitioned into corresponding column chunks 214, where each column chunk 214 also corresponds to one or multiple rows of the database table. A given container 220 contains one chunk 214 from each column 210. Moreover, the chunks 214 of a given container 220 are associated with a particular composite metadata object 120 (indicated by association arrows 221) so that the composite metadata object 120 contains information about and describes the chunks 210 of the associated container 220.

In accordance with example implementations, each chunk may represent exactly one column file, so that the data that is associated with a particular column in a particular projection may be stored multiple files (i.e., one file per chunk).

Figure 3:
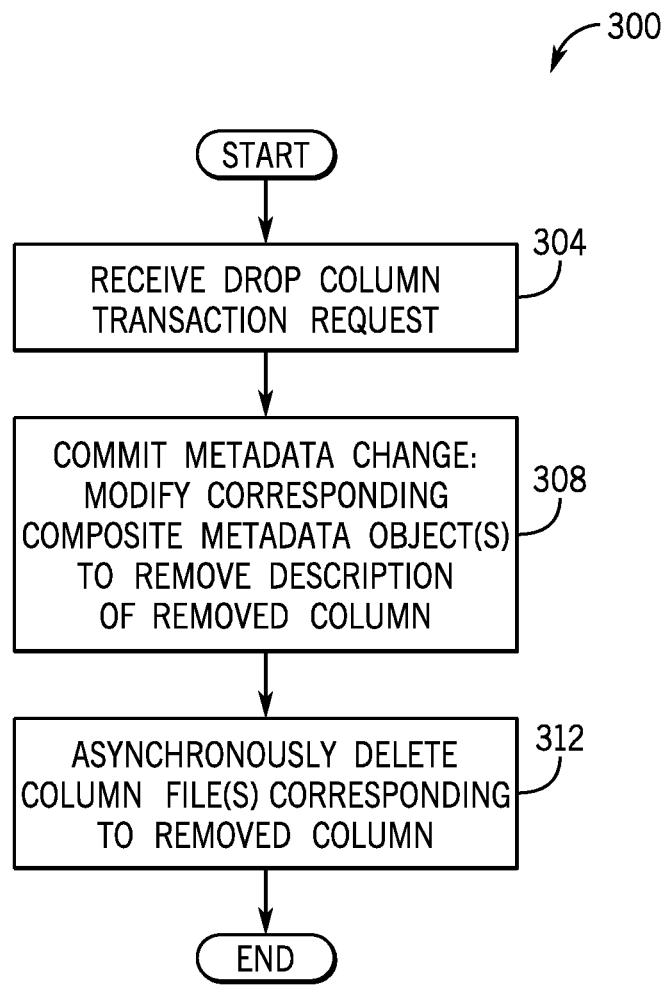
FIG. 3 is a flow diagram depicting a technique to process a Drop Column database transaction according to an example implementation.

The one-to-many mapping of the composite metadata objects 120 to the column chunks allows the composition of the composite metadata objects 120 to be changed dynamically. More specifically, FIG. 3 depicts an example technique 300 to remove, or drop, a column from a corresponding storage container according to an example implementation. Pursuant to the technique 300, a Drop Column transaction request is received, pursuant to block 304. In response to the request, the technique 300 includes processing the request, which includes the processing node 110 committing (block 308) the corresponding change to the metadata. The changing of the metadata includes modifying the corresponding composite metadata object(s) 120 to remove a description of the corresponding removed column.

Although the change in the metadata is committed, or made permanent, in the catalog, the corresponding change to the affected column file or files may be performed in a "lazy" fashion. In this manner, in accordance with example implementations, the removal of the column may affect several projections of the table and correspondingly, may ultimately result in the deletion, or deallocation, of one or multiple column files (depending on the number of projections). Although one way to update the data storage is to synchronize the deletion of the column file(s) with the committing of the change to the composite metadata object, in accordance with some implementations, the deletion of the column file(s) is performed asynchronously with respect to the commitment of the metadata. For example, in accordance with some implementations, the affected column file(s) may be deleted in a cleanup process, such as by a garbage collection process of the database system 100.

Figure 4:
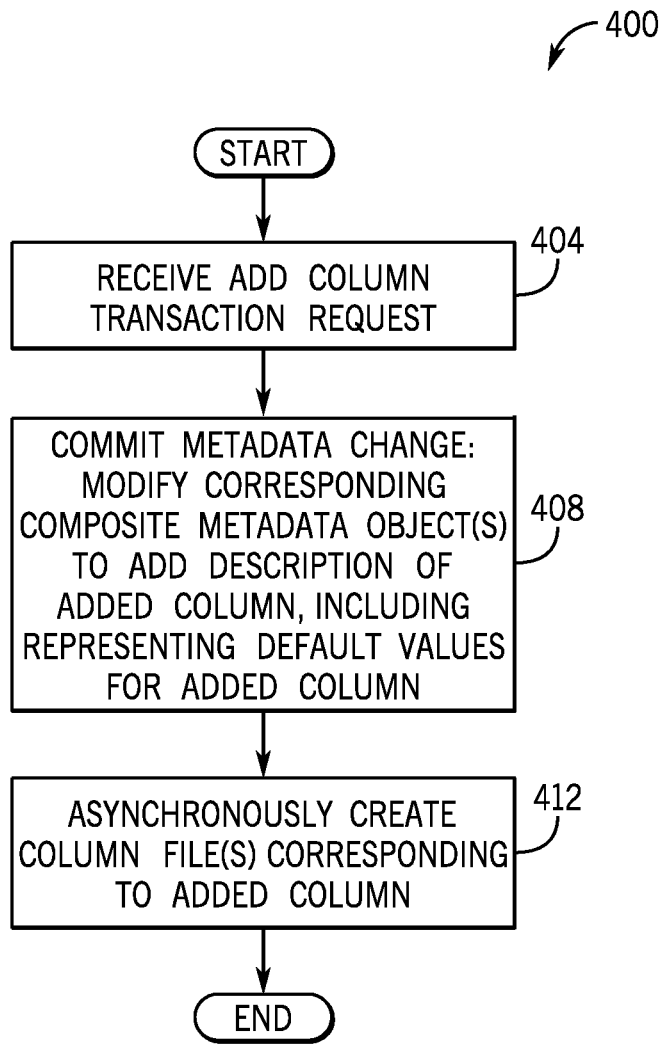
FIG. 4 is a flow diagram depicting a technique to process an Add Column database transaction according to an example implementation.

Referring to FIG. 4, in a similar fashion, when a column is added, the corresponding changes to database storage may be performed in a lazy fashion as well. More specifically, FIG. 4 depicts a technique 400 for processing an Add Column transaction request. In response to receiving (block 404) the Add Column transaction request, the corresponding metadata change is committed. In this manner, the processing node 110 modifies, or alters, corresponding composite metadata object(s) to add a description for the added column. In accordance with some implementations, this description may be a description that sets, or establishes, a predefined set of default values (null values, as an example) for the entire column. In other words, the processing node 110 may modify the affected composite metadata objects 120 to 1. add a description of a new column chunk to each object; and 2. store metadata for each object 120 to represent that the new column chunk contains default values (null values, for example).

Thus, a corresponding "lazy" approach may be employed for purposes of adding, or creating, the corresponding one or multiple column files for the added column. In this manner, as depicted in block 412 of the technique 400, in accordance with some implementations, one or multiple column files corresponding to the added column may be asynchronously created (with respect to the commitment of the metadata changes). For example, column files for the newly added column may not be created until a load data transaction is processed, which has data for the new column.

A particular advantage in the composite metadata object is that the number of columns in a given table projection may be varied on a per container basis, which allows support for tables with flexible, unstructured schemas. For example, a particular container for a projection may have a first number of columns (100 columns, as an example), whereas another storage container for the same projection may have a different number of columns (200 columns, for example).

Thus, in accordance with example implementations that are described herein, the total number of metadata objects is reduced, the number of tracked catalog dependencies that are indexed are reduced, and redundant storage container-variant information is reduced. These features, in turn, significantly reduce the memory footprint of the catalog and increase the overall performance of the database system. Moreover, the structure of the metadata, as described herein, allows lazy DDL transaction processing, such as the processing of Add Column and Drop Column statements, and provides support for unstructured data.

Figure 5:
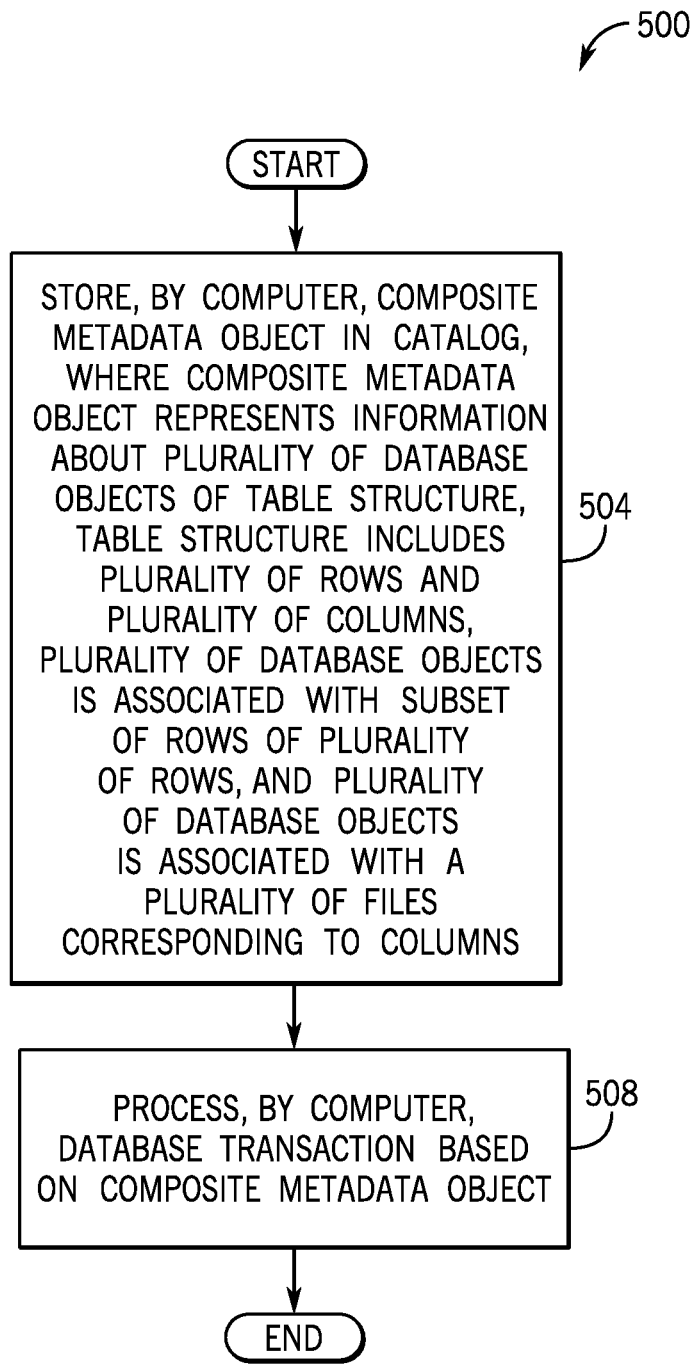
FIG. 5 is a flow diagram depicting a technique to process a transaction based on a composite metadata object according to an example implementation.

Thus, referring to FIG. 5, in accordance with example implementations, a technique 500 includes storing (block 504) a composite metadata object in a catalog. The composite metadata object represents information about a plurality of database objects of a table structure. The table structure includes a plurality of rows and a plurality of columns; the plurality of database objects is associated with a subset of rows of the plurality of rows; and the plurality of database objects is associated with a plurality of files, which correspond to the columns. The technique includes processing, by the computer, a database transaction based on the composite metadata object.

Figure 6:
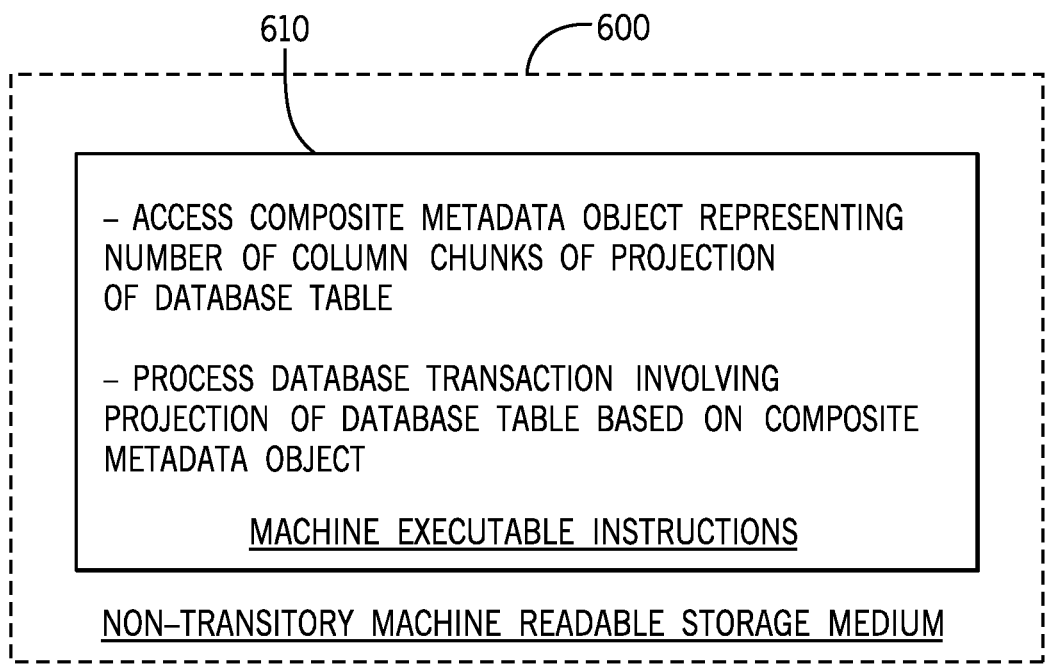
FIG. 6 is an illustration of machine executable instructions executed by a processing node of a database system to process a database transaction involving a projection of a database table based on a composite metadata object according to an example implementation.

Referring to FIG. 6, in accordance with example implementations, a non-transitory machine readable storage medium 600 stores instructions 610 that, when executed by a processing node of a database system, cause the processing node to access a composite metadata object representing a first number of column chunks of a projection of a database table; and process a database transaction involving the projection of the database table based on the composite metadata object.

Figure 7:
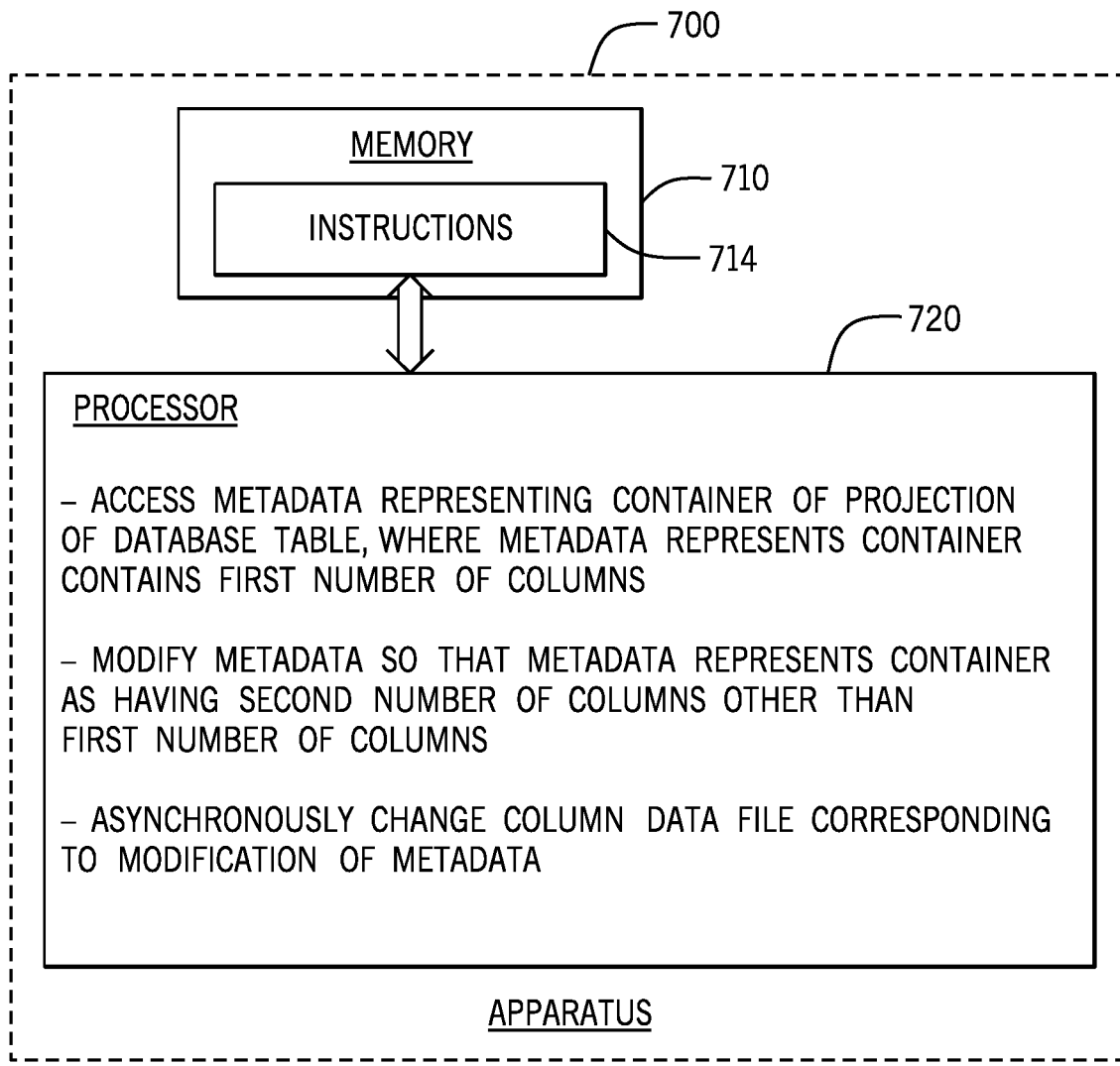
FIG. 7 is a schematic diagram of an apparatus to modify metadata and asynchronously change a column data file corresponding to the modification of the metadata according to an example implementation.

Referring to FIG. 7, in accordance with example implementations, an apparatus 700 includes a processor 720 and a memory 710 to store instructions 714 that, when executed by the processor 720, cause the processor 720 to access metadata representing information about a container of a projection of a database table. The metadata represents that the container contains a first number of columns of the projection. The instructions, when executed by the processor, cause the processor to modify the metadata so that the metadata represents the container as having a second number of columns other than the first number of columns; and asynchronously change a column data file corresponding to the modification of the metadata.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
storing, by a computer, a first composite metadata object in a catalog,
wherein the first composite metadata object represents information about a plurality of database objects of a table structure and provides a one-to many mapping to the plurality of database objects,
wherein the table structure comprises a plurality of rows and a plurality of columns, the plurality of database objects being associated with a subset of rows of the plurality of rows, and
wherein the plurality of database objects are associated with a plurality of column files corresponding to the columns;
processing, by the computer, a database transaction based on the first composite metadata object; and
committing a change to the first composite metadata object to represent a corresponding change to the table structure without synchronously committing a change to the plurality of column files to correspond to the change in the table structure.

2. The method of claim 1, wherein the table structure comprises a projection of a table and the projection of the table is associated with a subset of columns of the plurality of columns and wherein the subset of columns includes two or more columns and less that a total number of columns of the table.

3. The method of claim 1, further comprising:
asynchronously with respect to committing the change to the first composite metadata object, deleting a column file from the plurality of column files or adding a column file to the plurality of column files to correspond to the change in the table structure.

4. The method of claim 1, wherein:
the change to the table structure comprises a removal of a column of the plurality of columns from the table structure; and
committing the change to the first composite metadata object comprises changing the first composite metadata object to remove information about a database object of the plurality of database objects corresponding to the removed column.

5. The method of claim 1, wherein:
the change to the table structure comprises a removal of a column of the plurality of columns from the table structure; and
asynchronously deleting a column file or removing the column file comprises asynchronously deleting the column file corresponding to the removed column.

6. The method of claim 5, wherein asynchronously deleting the column file comprises deleting the column file in response to a garbage collection process.

7. The method of claim 1, wherein:
the change to the table structure comprises an addition of a column of the plurality of columns to the table structure; and
committing the change to the first composite metadata object comprises changing the first composite metadata object to add information about a database object of the plurality of database objects corresponding to the added column.

8. The method of claim 1, wherein:
the change to the table structure comprises an addition of a column of the plurality of columns to the table structure; and
asynchronously adding a column file comprises asynchronously adding the column file corresponding to a removed column.

9. The method of claim 8, wherein asynchronously adding the column file comprises adding the column file in response to processing a load transaction to load data to the table structure.

10. The method of claim 1, wherein changing the first composite metadata object to add information about a database object of the plurality of database objects comprises changing the first composite metadata object to represent that an added column comprises default values.

11. The method of claim 1, wherein:
the subset of rows comprises a first subset of rows;
the plurality of database objects comprises a first plurality of database objects associated with a first container of a projection of the table structure; and
a second plurality of database objects other than the first plurality of database objects is associated with a second container of a projection of the table structure and is associated with a second subset of rows of the plurality of rows other than the first subset of rows; and
the method further comprising:
storing a second composite metadata object in the catalog, wherein the second composite metadata object represents information about the second plurality of database objects; and
using the first and second composite metadata objects to represent unstructured data, wherein using comprises storing information in the first composite metadata object representing a first number of database objects for the first plurality of database objects, and storing information in the second composite metadata object representing a second number of database objects for the second plurality of database objects other than the first number of database objects.

12. A non-transitory machine readable storage medium storing instructions that, when executed by a processing node of a database system, cause the processing node to:
access a composite metadata object representing information about a first number of column chunks in a first container of a projection of a database table; and at a later point in time after accessing the composite metadata object, process a database transaction involving the projection of the database table based on the composite metadata object, wherein the composite metadata object provides a one-to many mapping to the first number of column chunks.

13. The storage medium of claim 12, wherein the instructions, when executed by the processing node, cause the processing node to change the first number of column chunks so that the composite metadata object represents a second number of column chunks less than or greater than the first number of column chunks.

14. The storage medium of claim 13, wherein the composite metadata object comprises a first composite metadata object, and the instructions, when executed by the processing node, cause the processing node to:

access a second composite metadata object representing a third number of column chunks of a second container of the projection of the database table, wherein the third number of column chunks is different than the second number of column chunks.

15. The storage medium of claim 14, wherein the first and second composite metadata objects represent unstructured data.

16. An apparatus, comprising:

a processor; and a memory to store instructions that, when executed by the processor, cause the processor to:

access metadata representing information about a container of a projection of a database table, wherein the metadata represents that the container contains a first number of columns of the projection of the database table and wherein the access of the metadata provides a one-to many mapping to the projection of the database table;

modify the metadata so that the metadata represents the container as having a second number of columns other than the first number of columns; and asynchronously and at a later in time after modifying the metadata, change a database storage associated with the projection of the database table to reflect the modification of the metadata.

17. The apparatus of claim 16, wherein the instructions, when executed by the processor, cause the processor to delete a file associated with the projection of the database table asynchronously in response to the modification of the metadata.

18. The apparatus of claim 16, wherein the instructions, when executed by the processor, cause the processor to modify the metadata in response to processing of a database transaction to remove a column from the projection of the database table.

19. The apparatus of claim 16, wherein the instructions, when executed by the processor, cause the processor to modify the metadata in response to processing a database transaction to add a column to the projection of the database table.

20. The apparatus of claim 19, wherein the instructions, when executed by the processor, cause the processor to create a file corresponding to the added column in response to processing a load transaction to load data into the added column.

* * * * *